US009424048B2

(12) United States Patent
Jakoboski et al.

(10) Patent No.: US 9,424,048 B2
(45) Date of Patent: Aug. 23, 2016

(54) INDUCTIVE PERIPHERAL RETENTION DEVICE

(71) Applicant: Microsoft Technology Licensing, LLC, Redmond, WA (US)

(72) Inventors: Timothy Allen Jakoboski, Woodinville, WA (US); Shiu Sang Ng, Kirkland, WA (US); William H. Standing, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 82 days.

(21) Appl. No.: 14/486,381

(22) Filed: Sep. 15, 2014

(65) Prior Publication Data

US 2016/0077843 A1    Mar. 17, 2016

(51) Int. Cl.
| | | |
|---|---|---|
| *H01R 31/00* | (2006.01) | |
| *G06F 9/44* | (2006.01) | |
| *G06F 13/10* | (2006.01) | |
| *H01R 31/06* | (2006.01) | |
| *G06F 1/26* | (2006.01) | |
| *H02J 7/02* | (2016.01) | |

(Continued)

(52) U.S. Cl.
CPC ............. *G06F 9/4413* (2013.01); *G06F 1/266* (2013.01); *G06F 3/03545* (2013.01); *G06F 13/102* (2013.01); *H01R 31/065* (2013.01); *H02J 7/0042* (2013.01); *H02J 7/025* (2013.01); *H02J 50/10* (2016.02); *G06F 2200/1632* (2013.01)

(58) Field of Classification Search
CPC .... H01R 13/60; H01R 13/73; H01R 13/518; H01R 27/02; H01R 31/06; H01R 31/065
USPC ......................................... 439/527–531, 638
See application file for complete search history.

(56) References Cited

U.S. PATENT DOCUMENTS

| | | |
|---|---|---|
| 5,576,981 A | 11/1996 | Parker et al. |
| 5,973,677 A | 10/1999 | Gibbons |
| 6,266,685 B1 | 7/2001 | Danielson et al. |

(Continued)

FOREIGN PATENT DOCUMENTS

| | | |
|---|---|---|
| CH | 687757 | 2/1997 |
| DE | 202011103087 | 8/2011 |

(Continued)

OTHER PUBLICATIONS

"International Search Report and Written Opinion", Application No. PCT/US2015/022349, Jun. 25, 2015, 9 Pages.

(Continued)

*Primary Examiner* — Chandrika Prasad
(74) *Attorney, Agent, or Firm* — Qudus Olaniran; Judy Yee; Micky Minhas

(57) ABSTRACT

Inductive peripheral retention device techniques are described. In one or more implementations, an apparatus includes a plug configured to removably engage a communication port of a device to form a communicative coupling with the device. The plug is securable to and removable from the device using one or more hands of a user. The apparatus also includes a peripheral securing portion connected to the plug and configured to removably engage a peripheral device via an inductive element formed as a flexible loop and configured to form a communicative coupling between the peripheral device and the device, which may be used to support charging of the apparatus.

20 Claims, 12 Drawing Sheets

(51) Int. Cl.
*G06F 3/0354* (2013.01)
*H02J 7/00* (2006.01)

(56) References Cited

U.S. PATENT DOCUMENTS

| | | | |
|---|---|---|---|
| 6,338,655 B1* | 1/2002 | Masse | H01R 31/005 |
| | | | 439/638 |
| 6,442,764 B1 | 9/2002 | Badillo et al. | |
| 6,468,090 B2* | 10/2002 | Belopolsky | H01R 13/6463 |
| | | | 439/495 |
| 7,437,193 B2 | 10/2008 | Parramon et al. | |
| 7,623,121 B2 | 11/2009 | Dodge | |
| 7,626,358 B2* | 12/2009 | Lam | H02J 7/0054 |
| | | | 320/107 |
| 7,639,876 B2 | 12/2009 | Clary et al. | |
| 7,905,753 B2* | 3/2011 | Siev | H01R 31/06 |
| | | | 439/638 |
| 8,363,036 B2 | 1/2013 | Liang | |
| 8,794,987 B2* | 8/2014 | Classen | H01R 13/5219 |
| | | | 439/189 |
| 9,360,893 B2 | 6/2016 | Bathiche et al. | |
| 2001/0033218 A1 | 10/2001 | Murata et al. | |
| 2002/0036253 A1 | 3/2002 | Lake | |
| 2002/0126445 A1 | 9/2002 | Minaguchi et al. | |
| 2003/0132916 A1 | 7/2003 | Kramer | |
| 2004/0100457 A1 | 5/2004 | Mandle | |
| 2004/0267323 A1 | 12/2004 | Dupelle | |
| 2005/0157459 A1 | 7/2005 | Yin et al. | |
| 2005/0240949 A1 | 10/2005 | Liu et al. | |
| 2006/0012567 A1 | 1/2006 | Sicklinger | |
| 2006/0081714 A1 | 4/2006 | King et al. | |
| 2006/0089171 A1 | 4/2006 | Yoo et al. | |
| 2006/0197755 A1 | 9/2006 | Bawany | |
| 2006/0238510 A1 | 10/2006 | Panotopoulos et al. | |
| 2007/0051766 A1 | 3/2007 | Spencer | |
| 2007/0247338 A1 | 10/2007 | Marchetto | |
| 2008/0180411 A1 | 7/2008 | Solomon et al. | |
| 2008/0224659 A1 | 9/2008 | Singh | |
| 2008/0232061 A1 | 9/2008 | Wang et al. | |
| 2008/0309636 A1 | 12/2008 | Feng et al. | |
| 2009/0007001 A1 | 1/2009 | Morin et al. | |
| 2009/0102794 A1 | 4/2009 | Lapstun et al. | |
| 2009/0250366 A1 | 10/2009 | Esfahani | |
| 2010/0001963 A1 | 1/2010 | Doray et al. | |
| 2010/0021022 A1 | 1/2010 | Pittel et al. | |
| 2010/0055928 A1* | 3/2010 | Randall | G06F 1/1632 |
| | | | 439/1 |
| 2010/0075517 A1 | 3/2010 | Ni et al. | |
| 2010/0188338 A1 | 7/2010 | Longe | |
| 2010/0231556 A1 | 9/2010 | Mines et al. | |
| 2010/0244577 A1 | 9/2010 | Shimokawa | |
| 2010/0245221 A1 | 9/2010 | Khan | |
| 2011/0234502 A1 | 9/2011 | Yun et al. | |
| 2011/0248941 A1 | 10/2011 | Abdo et al. | |
| 2012/0087078 A1 | 4/2012 | Medica et al. | |
| 2012/0106082 A1 | 5/2012 | Wu et al. | |
| 2012/0170966 A1 | 7/2012 | Novak, Jr. | |
| 2013/0050922 A1 | 2/2013 | Lee et al. | |
| 2013/0076617 A1 | 3/2013 | Csaszar et al. | |
| 2013/0093388 A1 | 4/2013 | Partovi | |
| 2013/0106723 A1 | 5/2013 | Bakken et al. | |
| 2013/0229386 A1 | 9/2013 | Bathiche | |
| 2013/0279098 A1 | 10/2013 | Cho | |
| 2013/0288516 A1 | 10/2013 | Chang et al. | |
| 2013/0301200 A1 | 11/2013 | Leung | |
| 2013/0335330 A1 | 12/2013 | Lane | |
| 2013/0335902 A1 | 12/2013 | Campbell | |
| 2013/0335903 A1 | 12/2013 | Raken | |
| 2013/0342465 A1 | 12/2013 | Bathiche | |
| 2013/0346636 A1 | 12/2013 | Bathiche | |
| 2014/0028635 A1 | 1/2014 | Krah | |
| 2014/0029183 A1 | 1/2014 | Ashcraft et al. | |
| 2014/0036430 A1 | 2/2014 | Wroblewski et al. | |
| 2014/0061406 A1 | 3/2014 | Chevalier et al. | |
| 2014/0098485 A1 | 4/2014 | Vahid | |
| 2014/0117928 A1 | 5/2014 | Liao | |
| 2014/0173517 A1 | 6/2014 | Chaudhri | |
| 2014/0187288 A1 | 7/2014 | Correll, Jr. | |
| 2014/0341056 A1 | 11/2014 | Carbajal | |
| 2015/0277500 A1 | 10/2015 | Turowski et al. | |
| 2015/0310043 A1 | 10/2015 | Adelman | |
| 2016/0034001 A1 | 2/2016 | Huston et al. | |

FOREIGN PATENT DOCUMENTS

| | | |
|---|---|---|
| GB | 2102632 | 2/1983 |
| GB | 2178570 | 2/1987 |
| NL | 1038411 | 5/2012 |
| TW | M482205 | 7/2014 |
| WO | WO-2010011983 | 1/2010 |

OTHER PUBLICATIONS

"International Search Report and Written Opinion", Application No. PCT/US2015/042551, Oct. 6, 2015, 13 Pages.

"Non-Final Office Action", U.S. Appl. No. 14/229,507, Nov. 10, 2015, 11 pages.

"Non-Final Office Action", U.S. Appl. No. 14/450,023, Sep. 25, 2015, 18 pages.

"Cholesteric Liquid Crystal", Retrieved from: <http://en.wikipedia.org/wiki/Cholesteric_liquid_crystal> on Aug. 6, 2012, Jun. 10, 2012, 2 pages.

"Final Office Action", U.S. Appl. No. 13/603,918, Mar. 21, 2014, 14 pages.

"i-Interactor electronic pen", Retrieved from: <http://www.alibaba.com/product-gs/331004878/i_Interactor_electronic_pen.html> on Jun. 19, 2012, 2012, 5 pages.

"International Search Report and Written Opinion", Application No. PCT/US2013/044871, Aug. 14, 2013, 12 pages.

"International Search Report and Written Opinion", Application No. PCT/US2013/044873, Nov. 22, 2013, 9 pages.

"International Search Report and Written Opinion", Application No. PCT/US2013/045049, Sep. 16, 2013, 9 pages.

"MPC Fly Music Production Controller", AKAI Professional, Retrieved from: <http://www.akaiprompc.com/mpc-fly> on Jul. 9, 2012, 4 pages.

"neXus Charging Cradle", Retrieved from <http://www.gen-xtech.com/neXus.php> on Jul. 28, 2014, Apr. 17, 2012, 2 pages.

"Non-Final Office Action", U.S. Appl. No. 13/603,918, Dec. 19, 2013, 12 pages.

"Rechargeable Stylus Pen", Retrieved from <http://www.e-pens.com/uk/rechargeable-stylus-pen.html> on Jul. 28, 2014, Jul. 5, 2013, 1 pages.

"Reflex LCD Writing Tablets", retrieved from <http://www.kentdisplays.com/products/lcdwritingtablets.html> on Jun. 27, 2012, 3 pages.

"Restriction Requirement", U.S. Appl. No. 13/603,918, filed Nov. 27, 2013, 8 pages.

"Smart Board™ Interactive Display Frame Pencil Pack", Available at <http://downloads01.smarttech.com/media/sitecore/en/support/product/sbfpd/400series(interactivedisplayframes)/guides/smartboardinteractivedisplayframepencilpackv12mar09.pdf>, 2009, 2 pages.

"Write & Learn Spellboard Advanced", Available at <http://somemanuals.com/Vtech,Write%2526LEARN—Spellboard—Adv—71000,JIDFHE.Pdf>, 2006, 22 pages.

Bathiche, et al.," "Input Device with Interchangeable Surface", U.S. Appl. No. 13/974,749, filed Aug. 23, 2013, 51 pages.

Lane, et al.,' "Media Processing Input Device", U.S. Appl. No. 13/655,065, filed Oct. 18, 2012, 43 pages.

Qin, et al.,' "pPen: Enabling Authenticated Pen and Touch Interaction on Tabletop Surfaces", In Proceedings of ITS 2010, Available at <http://www.dfki.de/its2010/papers/pdf/po172.pdf>,Nov. 2010, pp. 283-284.

Sumimoto, "Touch & Write: Surface Computing With Touch and Pen Input", Retrieved from: <http://www.gottabemobile.com/2009/08/07/touch-write-surface-computing-with-touch-and-pen-input/> on Jun. 19, 2012, Aug. 7, 2009, 4 pages.

(56) References Cited

OTHER PUBLICATIONS

Van "Lenovo Thinkpad Tablet 2 Review", Retrieved from: <http://www.digitaltrends.com/tablet-reviews/lenovo-thinkpad-tablet-2-review/> Jan. 29, 2014, Feb. 12, 2013, 7 Pages.
"International Search Report and Written Opinion", Application No. PCT/US2015/049270, Feb. 23, 2016, 14 pages.
"Final Office Action", U.S. Appl. No. 14/229,507, Apr. 26, 2016, 15 pages.
"Final Office Action", U.S. Appl. No. 14/450,023, Feb. 2, 2016, 25 pages.
"Final Office Action", U.S. Appl. No. 14/462,280, May 20, 2016, 34 pages.
"Final Office Action", U.S. Appl. No. 14/477,014, Jun. 8, 2016, 20 pages.
"Final Office Action", U.S. Appl. No. 14/697,501, Apr. 18, 2016, 14 pages.
"International Preliminary Report on Patentability", Application No. PCT/US2015/022349, Apr. 21, 2016, 6 pages.
"Notice of Allowance", U.S. Appl. No. 14/465,307, Jun. 6, 2016, 7 pages.
"Supplemental Notice of Allowance", U.S. Appl. No. 14/468,699, May 9, 2016, 4 pages.
"Supplemental Notice of Allowance", U.S. Appl. No. 14/468,699, Jun. 20, 2016, 4 pages.

\* cited by examiner

INDUCTIVE PERIPHERAL RETENTION DEVICE

BACKGROUND

Computing devices may employ peripheral devices to aid a user in interacting with the computing device. An example of this is an alternate input device, such as a stylus, that may be used to aid a user in interacting with touchscreen and other functionality of the computing device. A user, for instance, may utilize the stylus to draw on a surface of the touchscreen to make annotations, notes, and other indicia.

Conventional techniques utilized to store the stylus, however, could be problematic in a number of different ways. For example, use of an internal slot to store and retain the stylus through friction or through a push-push type mechanism may create a problem where extra space and parts are required inside the device. This may also cause an increase in the complexity of the device, overall size of the device which may be undesirable for mobile configurations, and may therefore hinder the user's experience with the device.

In another example, use of a lanyard and a pen cap may operate somewhat as an uncontrolled appendage and therefore get caught on other objects, pen caps tend to let the pen fall out due to limitations of a retention force that may be used, and so on. Consequently, a user may choose to forgo use of this additional functionality supported by the peripheral device due to these complications.

SUMMARY

Inductive peripheral retention device techniques are described. In one or more implementations, an apparatus includes a plug configured to removably engage a communication port of a device to form a communicative coupling with the device. The plug is securable to and removable from the device using one or more hands of a user. The apparatus also includes a peripheral securing portion connected to the plug and configured to removably engage a peripheral device via an inductive element formed as a flexible loop and configured to form a communicative coupling between the peripheral device and the device.

In one or more implementations, inductance is detected of a flexible element configured to transfer power to a peripheral device via inductance. Responsive to a determination that the detected inductance is above a threshold, a first power mode is utilized in which a first amount of power is provided to the flexible element. Responsive to a determination that the detected inductance is below a threshold, a second power mode is utilized in which a second amount of power is provided to the flexible element that is less than the first amount of power.

In one or more implementations, an apparatus includes a single ferrous element formed as a single integral piece having a middle portion having a diameter about an axis that is less than a diameter of opposing ends of the single ferrous element along the axis and a coil wrapped around the middle portion such that the coil and the single ferrous element form an inductive coil that is substantially rotationally invariant around the axis when charging This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Computing devices may employ a wide range of peripheral devices to support different types of user interaction with the device. This may include input devices that are configured to be used in addition to the computing device, an example of which is a stylus. However, conventional techniques that are utilized to store peripheral devices are often cumbersome and hindered a user's interaction with both the peripheral device and the computing device.

Inductive peripheral retention device techniques are described. In one or more implementations, a peripheral retention device is configured to be secured to a computing device or other device (e.g., a peripheral device of the computing device such as a monitor, keyboard, and so on) using a plug that is configured to engage a communication port, e.g., a USB port or other port. The peripheral retention device also includes a peripheral securing portion that is connected to the plug to retain a peripheral device, such as a stylus.

The peripheral securing portion, for instance, may include an inductive element formed as a flexible loop that is configured to at least partially surround the peripheral device and form a communicative coupling between the peripheral device and the computing device, such as to charge the peripheral device, transfer data, and so forth. In this way, efficiency of charging using the loop may increase over conventional techniques and flexibility of the loop may be used to limit interference of the loop with a user when not in use, e.g., may lay flat. Additionally, this flexibility may serve as a basis to control power output to the loop and thus improve efficiency of the device as further described in the following.

An inductive element is also described that may be utilized to support rotationally invariant induction. The inductive element, for instance, may be shaped to mimic a barbell such that flux lines of the inductive element have a shape that mimics a donut. In this way, the inductive element may be utilized to support induction by a device without having to rotate the device in a particular orientation, such as for use by a stylus, a flexible hinge of a peripheral device (e.g., keyboard) or computing device, and so on. Further discussion of these features may be found in relation to FIGS. 8 and 9.

In the following discussion, an example environment is first described that may employ the techniques described herein. Example mechanisms are also described which may be performed in the example environment as well as other environments. Consequently, use of the example mechanisms is not limited to the example environment and the example environment is not limited to use of the example mechanisms.

Example Environment

Figure 1:
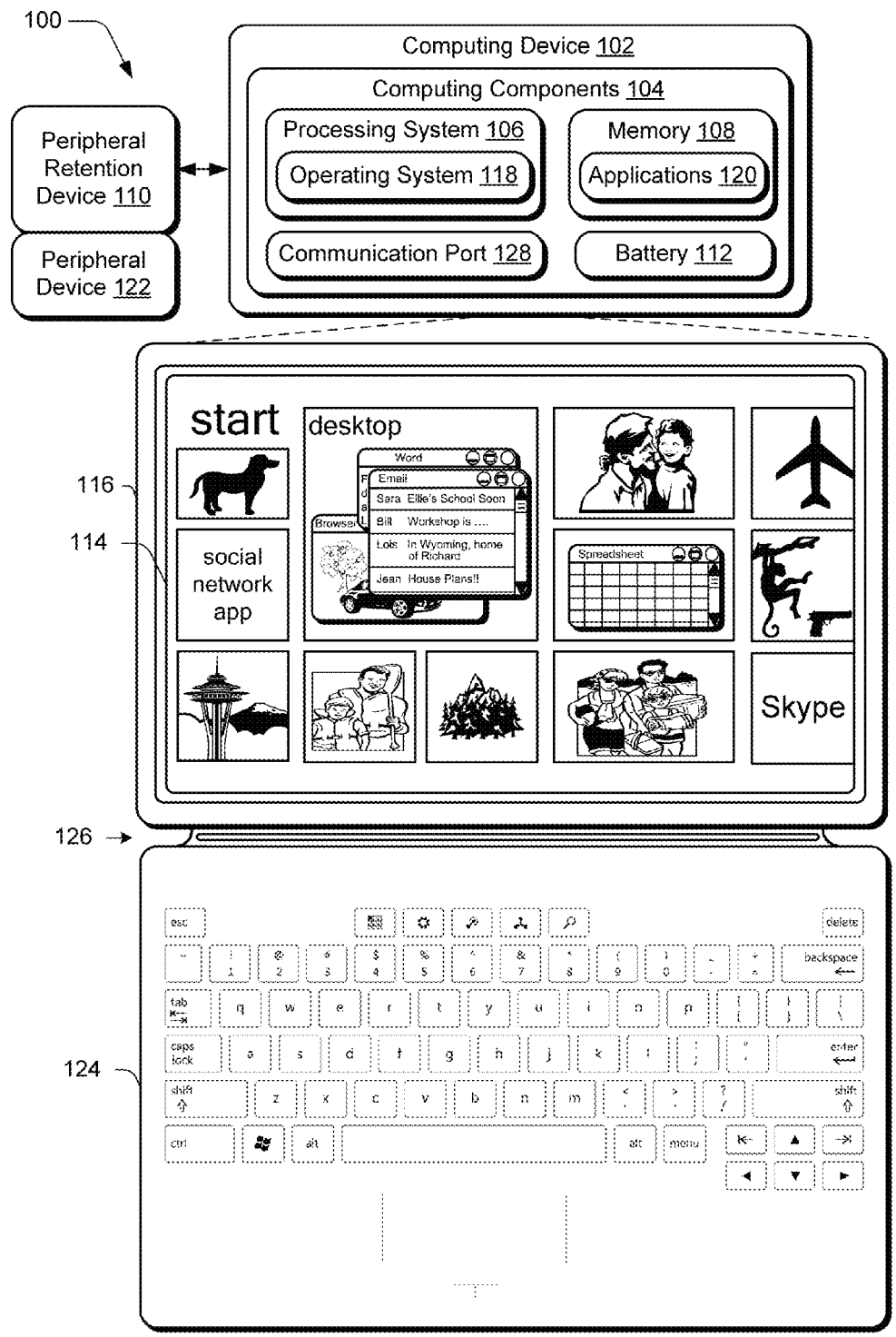
FIG. 1 is an illustration of an environment in an example implementation that is operable to employ the techniques described herein to secure and charge a peripheral device.

FIG. 1 is an illustration of an environment 100 in an example implementation that is operable to employ techniques described herein. The illustrated environment 100 includes a computing device 102 having a plurality of computing components 104 that are implemented at least partially in hardware. Illustrated examples of these computing components 104 include a processing system 106 and a computer-readable storage medium that is illustrated as a memory 108, a peripheral retention device 110, battery 112, and display device 114 that are disposed within and/or secured to a housing 116.

The computing device 102 may be configured in a variety of ways. For example, a computing device may be configured as a computer that is capable of communicating over a network, such as a desktop computer, a mobile station, an entertainment appliance, a set-top box communicatively coupled to a display device, a wireless phone, a game console, and so forth. Thus, the computing device 102 may range from full resource devices with substantial memory and processor resources (e.g., personal computers, game consoles) to a low-resource device with limited memory and/or processing resources (e.g., traditional set-top boxes, hand-held game consoles).

The computing device 102 is further illustrated as including an operating system 118. The operating system 118 is configured to abstract underlying functionality of the computing device 102 to applications 120 that are executable on the computing device 102. For example, the operating system 118 may abstract the computing components 104 of the computing device 102 such that the applications 120 may be written without knowing "how" this underlying functionality is implemented. The application 120, for instance, may provide data to the operating system 118 to be rendered and displayed by the display device 114 without understanding how this rendering will be performed, may receive inputs detected using touchscreen functionality of the display device 114, and so on. The operating system 118 may also represent a variety of other functionality, such as to manage a file system and user interface that is navigable by a user of the computing device 102.

The computing device 102 may support a variety of different interactions. For example, the computing device 102 may include one or more hardware devices that are manipulable by a user to interact with the device, which may include peripheral devices 112 (e.g., cursor control device such as a mouse, stylus), a keyboard 124 communicatively and physically coupled to the computing device 102 using a flexible hinge 126, and so on.

Peripheral devices 122 such as a stylus may be lost in some instances by a user because the device is not physically attached to the computing device 102, especially in hand-held (i.e., mobile) configurations of the computing device 102. However, conventional techniques that were utilized to secure the stylus to the computing device 102 could consume inordinate amounts of room within a housing 116 (e.g., by internal slot is used to store and retain the stylus through friction or through a push-push type mechanism), interfere with a user's interaction with a device (e.g., a lanyard), and so forth. Accordingly, the peripheral retention device 110 may be configured to secure the peripheral device 122 to the housing 116 in a manner that does not interfere with a user's interaction with the computing device 102.

Further, the peripheral retention device 110 may also be configured to support a communicative coupling with a communication port 128 of the computing device, such as to transfer power to charge the peripheral device 122, communicate data between the peripheral device 122 and the computing device 102, and so on. For example, it is now common practice to use a stylus to draw on the touch enabled displays of laptops and tablets. In some instances, the stylus may be configured to consume power to support this interaction.

In one such instance, an active stylus is configured to improve on detectability of a passive stylus by emitting signals that are received by touchscreen functionality of the display device 114 to improve spatial resolution of a tip of the stylus. The tip may even be located when it is hovering above a surface of the display device 114. The active stylus may also consume power to support Bluetooth® communication, button activated features, and so on. Other features that may consume power include detection of stylus angle and rotation the pen tip to adjust ink thickness, haptic or acoustic feedback of pen function or notifications, support use as a laser pointer for meeting room collaboration, include a text display for status and notifications, communicate device status, email, and others notification with always on communication and LED indicators, support audio recording and data storage, and so forth. This power may be supplied by rechargeable storage included as part of the peripheral device, e.g., a battery or super capacitor.

Conventional techniques utilized to provide power to the rechargeable storage may have a variety of drawbacks. For example, use of a micro USB connector by a stylus generally involves placement of the connector on an end of the stylus opposite the tip. Charging the stylus by plugging it into a USB port also necessitates either having an additional USB cable or plugging directly into a tablet or laptop. This may involve stylus disassembly, a common USB port across the product line, and has a risk of product damage as it is cantilevered while charging.

Another conventional technique involves the addition of conductive charging points to an outside of the stylus to directly connect it to charging points on the device that supplies power, e.g., a computing device. This direct galvanic charging technique, however, may interfere with the industrial design, exposes the contact points to wear and damage, and may be restricted in its alignment to connect the stylus contacts to a power source in a predictable manner.

Accordingly, the peripheral retention device 110 may be configured to support wireless inductive charging. For example, the peripheral device 122 may include a receiving coil inside which, when coupled to an external, powered, primary charging coil of the peripheral retention device 110, form the secondary of a transformer. This air gap transformer is what sends power into the peripheral 122 and thereby support a communicative coupling between the peripheral device 122, the peripheral retention device 110, and the computing device 102 which may also be utilized to communicate data between the devices.

Figure 4:
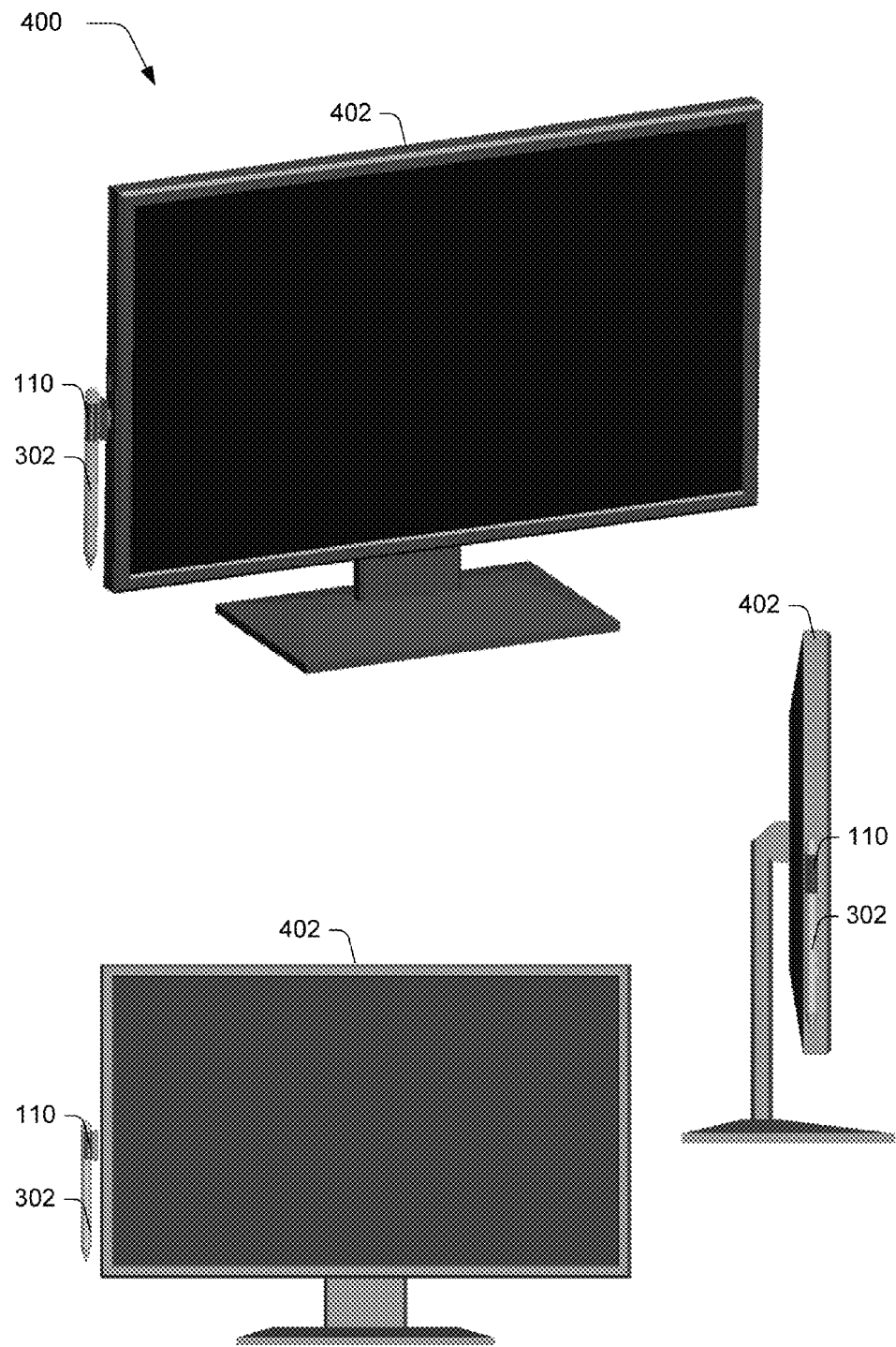
FIG. 4 depicts another example implementation in which the peripheral retention device of FIG. 3 is used to secure the stylus to a standalone display device.

Although the peripheral retention device 110 is illustrated as connected to a communication port 128 of the computing device 102, the peripheral retention device 110 may be coupled to a variety of other devices, such as an external battery device (e.g., for mobile charging), an external charging device (e.g., to plug into a wall socket), a communication port 128 on the input device 124, a monitor as shown in FIG. 4, and so on.

Figure 2:
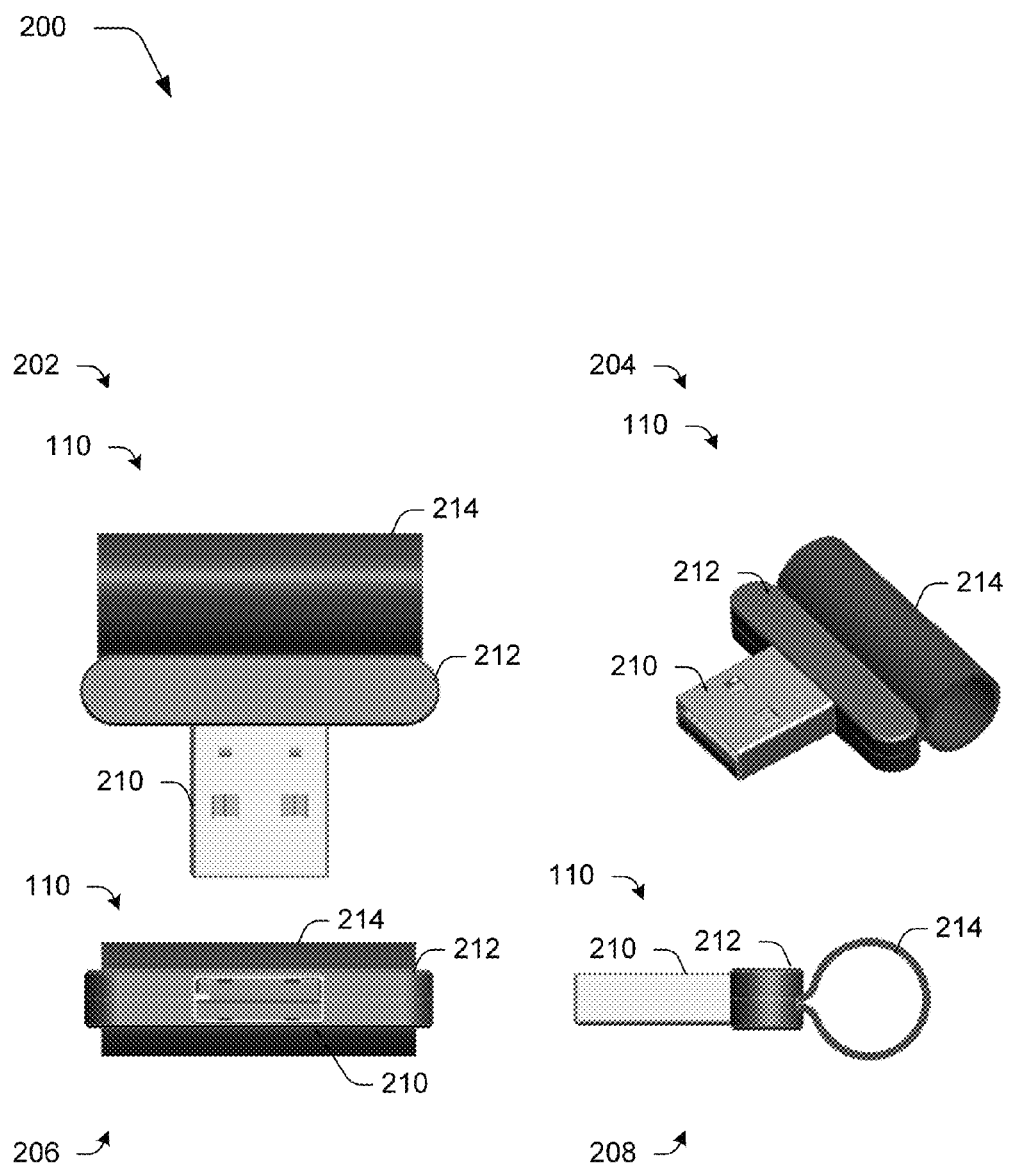
FIG. 2 depicts an example implementation showing different views of an example of a peripheral retention device of FIG. 1.

FIG. 2 depicts an example implementation 200 showing different views of an example of a peripheral retention device 110 of FIG. 1. This example implementation includes top 202, perspective 204, front 206, and side 208 views of an example of a peripheral retention device 110. The peripheral retention device 110 includes a plug 210 that is configured to be secured to a communication port 128 of a device. The plug 210 in this example is illustrated as being formed in compliance with a Type A Universal Serial Bus (USB) but it should be readily apparent that other configurations are also contemplated, such as in compliance with other types of USB ports (e.g., Type B, Mini-AB, Mini-B, Micro-AB, Micro-B, Type C), Thunderbolt® communication ports, and so on. Other examples are also contemplated, such as use without a plug, e.g., permanently mounted to the computing device.

The peripheral retention device 110 also includes a peripheral securing portion 212 connected to the plug and configured to removably engage a peripheral device, which in this example is performed using a flexible loop 214. The flexible loop 214, for example, may be configured to flex and stretch to retain a peripheral device, such as a stylus, within an interior of the flexible loop 214.

Figure 3:
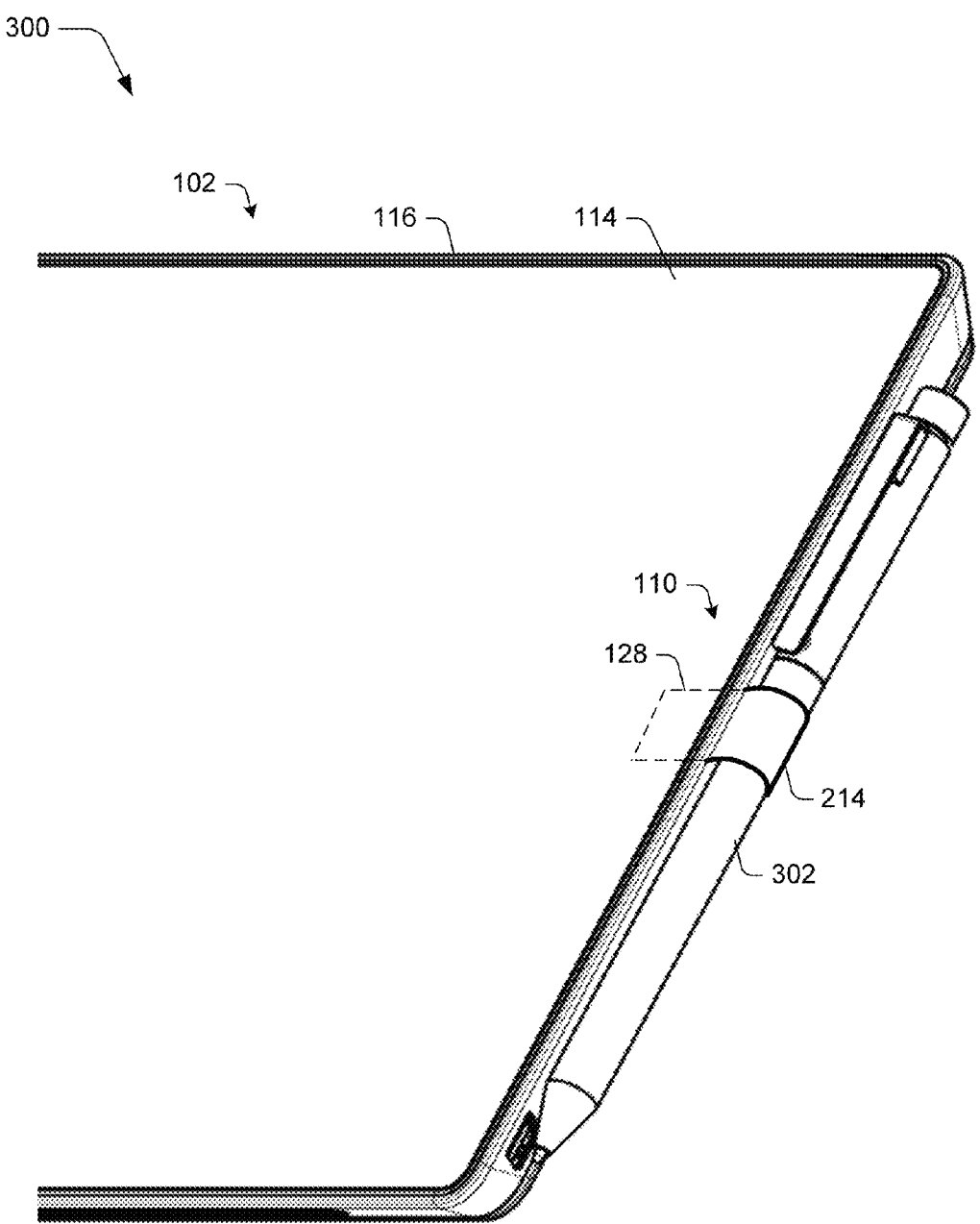
FIG. 3 depicts an example implementation showing retention of a peripheral device configured as a stylus by the peripheral retention device of FIG. 2 thereby securing the stylus to a computing device.

As shown in an example implementation 300 of FIG. 3, for instance, the peripheral retention device 110 may be secured to a communication port 128 which is illustrated in phantom. An example of a peripheral device 122 of FIG. 1 is illustrated as a stylus 302 that is retained within the flexible loop 214 and thus secured to the computing device 102.

In the illustrated example, the flexible loop 214 assumes a complementary shape of the peripheral being secured through use of a flexible material, such as a fabric, rubber, or elastic material. Other examples are also contemplated including examples in which the peripheral retention device 110 utilizes techniques that are not flexible, e.g., is molded to conform to an outer surface of a peripheral device 122 to be retained.

The flexible loop 214 may also be configured to provide a biasing force to secure the peripheral. For example, formation as a flexible and stretchable loop (e.g., elastic) may bias the peripheral toward the housing 116 and thereby retain the peripheral against the housing 116. Other examples are also contemplated.

Figure 11:
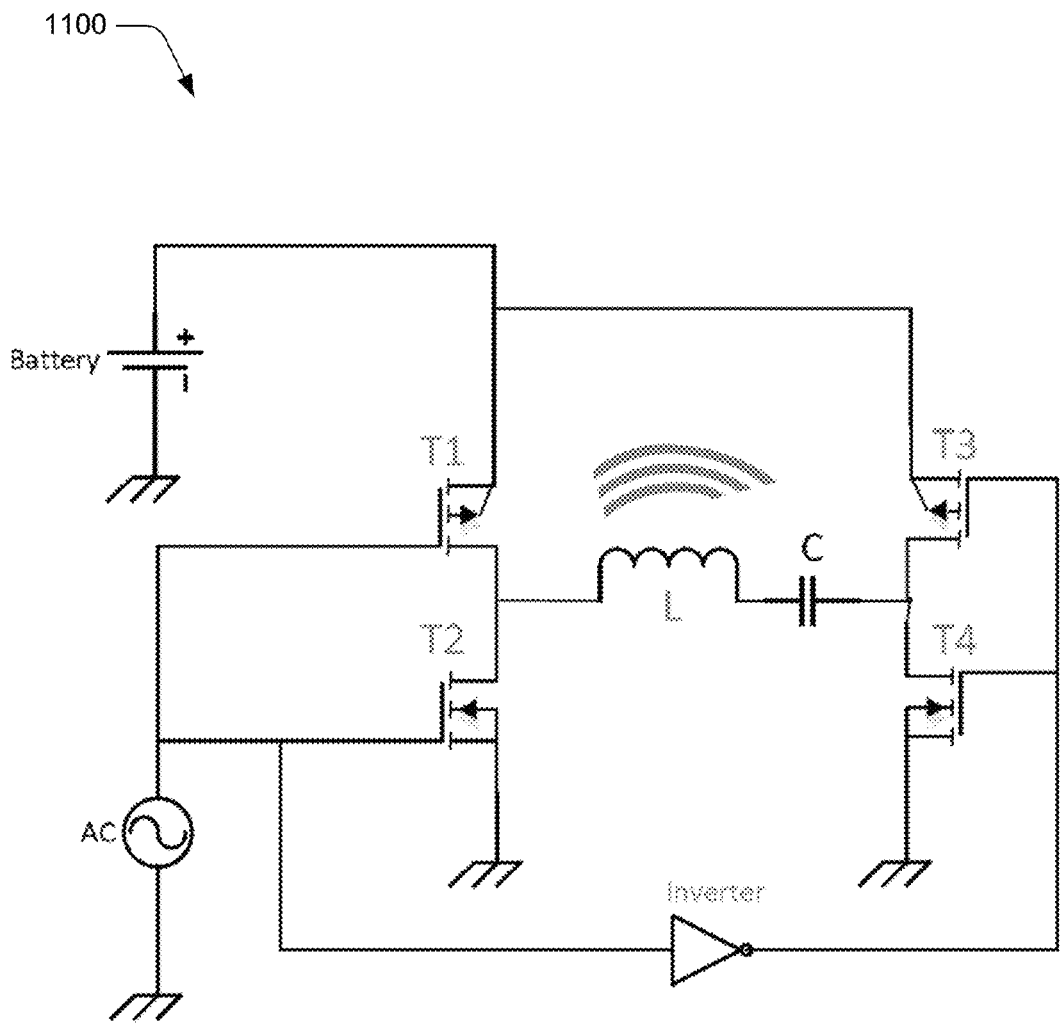
FIG. 11 depicts an example implementation of a circuit usable by a peripheral retention device to act as a primary coil of an air gap transformer.

The use of a flexible material to form the flexible loop 214 may also support a variety of other functionality. For example, the flexible loop 214 may be configured to "flatten" as shown in FIG. 11. The computing device 102, for instance, may be placed on a surface which causes the flexible loop to flatten against the surface when a stylus 302 is not retained by the device. Additionally, this may permit the stylus 302 to "rotate up" away from the surface such that the computing device 102 may lay flat against the surface. In this way, the peripheral retention device 110 does not interfere with a user's interaction with the computing device 102.

FIG. 4 depicts another example implementation 400 in which the peripheral retention device 110 of FIG. 3 is used to secure the stylus 302 to a standalone display device. In this example, the peripheral retention device 110 is secured to a communication port of a standalone display device 402. In this way, the stylus 302 may be secured "out of the way" when not in use. Further, the stylus 302 may also be charged through use of an inductive element formed as part of the peripheral retention device 110, further discussion of which may be found in the following and is shown in a corresponding figure.

Figure 5:
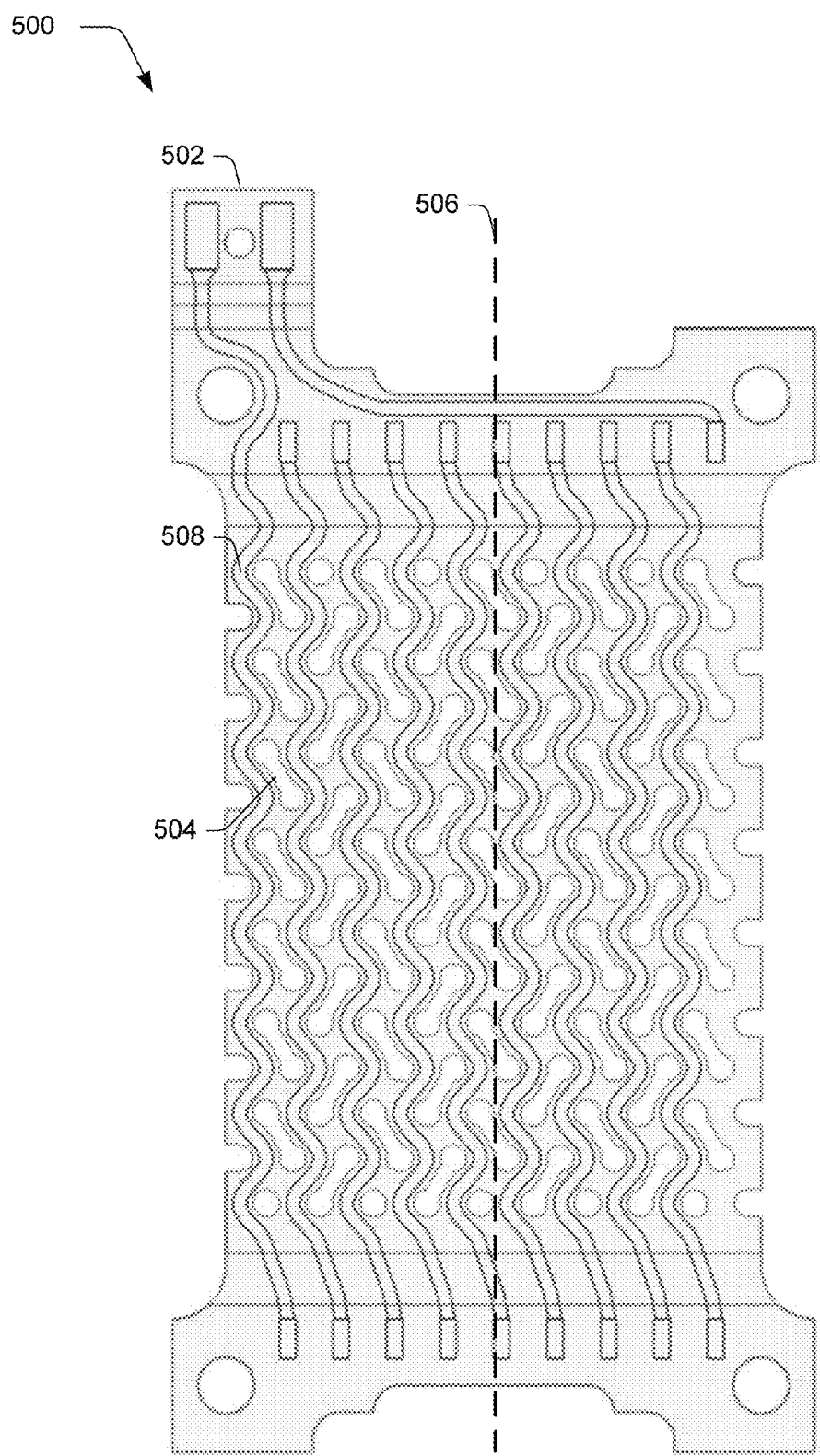
FIG. 5 depicts an example implementation in which an inductive element of a peripheral retention device of FIG. 2 is configured to support flexible movement and stretching.

FIG. 5 depicts an example implementation 500 showing an inductive element 502 of a peripheral retention device 110 of FIG. 3. The inductive element 502 in this example is configured to be both flexible and stretchable. This is performed by including elliptical perforations 504 in this example that have a generally barbell shape in which ends of the perforations 504 have a greater width than a midsection of the perforations 504. Other perforation shapes are also contemplated.

Figure 6:
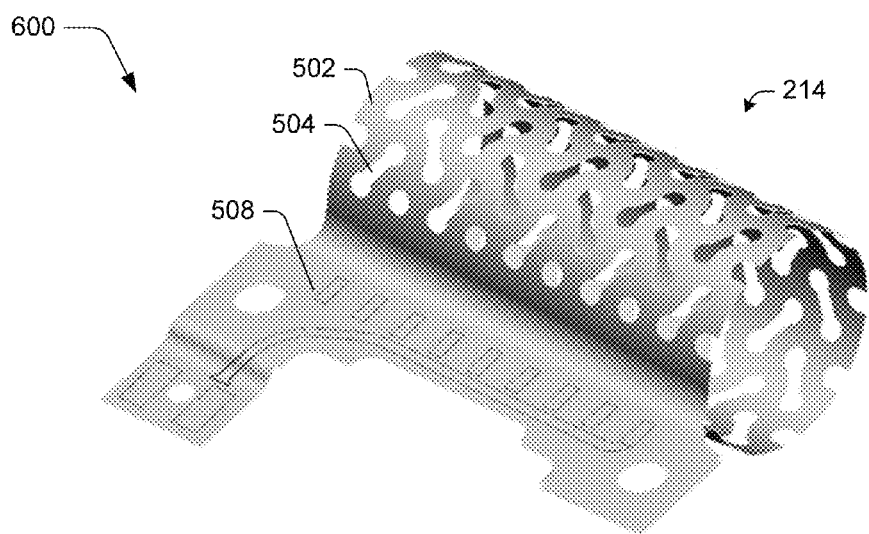
FIG. 6 depicts an example implementation in which an inductive element of FIG. 5 is bent to form a flexible loop.

The perforations 504 are also arranged at a generally forty-five degree angle in relation to a longitudinal axis 506 that is configured to form a bend to assume a cylindrical shape as shown in FIG. 6 and support stretching in both x and y directions. Additionally, the perforations 504 have an alternating arrangement of angles, one to another, in relation to the axis 506.

The inductive element 502 also includes traces 508 that are configured to carry an electrical current to form the inductive connection. By implementing the inductive element 502 as a primary coil on a substrate (e.g., polyimide substrate) with a sinusoidal trace pattern and elliptical perforations 504, the inductive element 502 becomes both flexible and stretchable to allow the flexible loop to collapse when not used and to resist damage during the insertion and removal of a peripheral device 122 such as a stylus 302.

FIG. 6 depicts an example implementation 600 in which the inductive element 502 of FIG. 5 is bent to form a flexible loop 502. As illustrated the perforations 504 of the inductive element 502 permit bending to form a loop. The perforations 504 may also permit stretching such as to provide an elastic force to retain a peripheral device 122 within the flexible loop 216 as previously described. The traces 508 are configured to form an inductive electrical field within an interior of the flexible loop 214 thereby forming an inductive communicative coupling.

Figure 7:
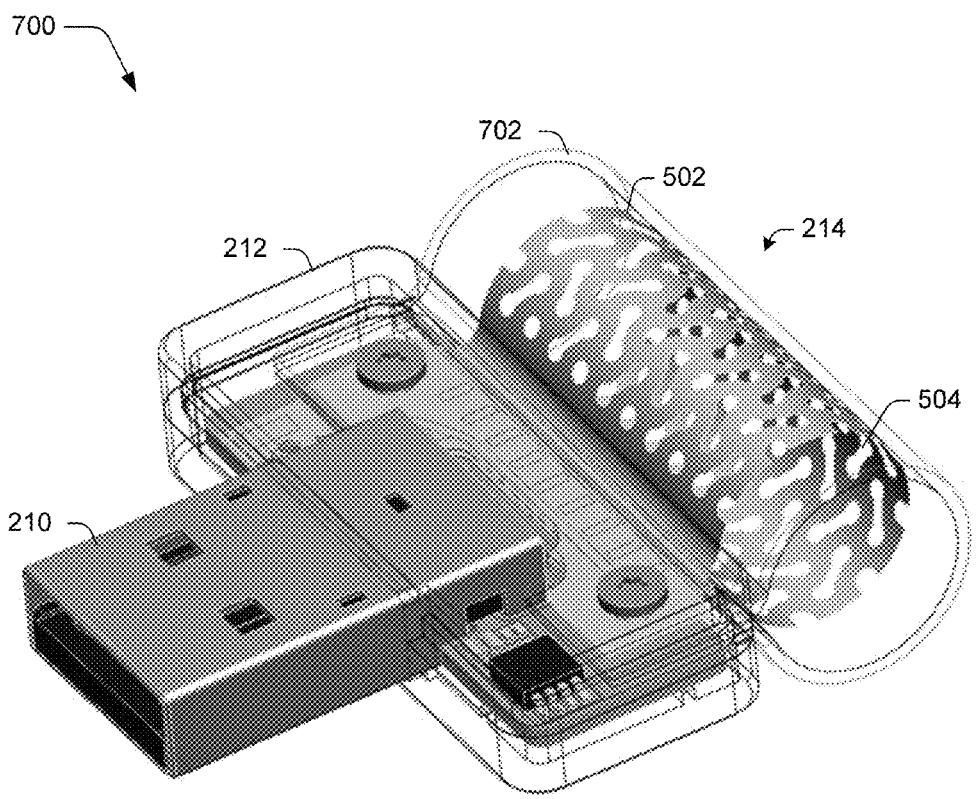
FIG. 7 depicts an example implementation in which the inductive element of FIG. 6 is installed as part of the peripheral retention device of FIG. 2.

FIG. 7 depicts an example implementation 700 in which the inductive element 502 of FIG. 6 is installed as part of the peripheral retention device 110 of FIG. 2. In this example, the inductive element 502 (e.g., primary coil) is configured as a flexible loop that is surrounded by a fabric 702. The inductive element 502 is communicatively coupled to the plug 210 as part of the peripheral securing portion 212 and thus may receive electricity from a communication port 128 of a device as previously described.

Conventionally, a primary coil of an air gap transformer for accessory charging is constructed flat as a "charging pad". However, wrapping a primary coil around the secondary coil increases efficiency in a transfer of power from the charger to the accessory, e.g., by over seventy-seven percent. Testing of this prototype (FIG. 1) has yielded an efficiency of up to 77% and indicates that it is feasible to fully charge a 160 mA Lithium rechargeable stylus in approximately an hour and approximately half an hour for a super-capacitor cell.

Figure 8:
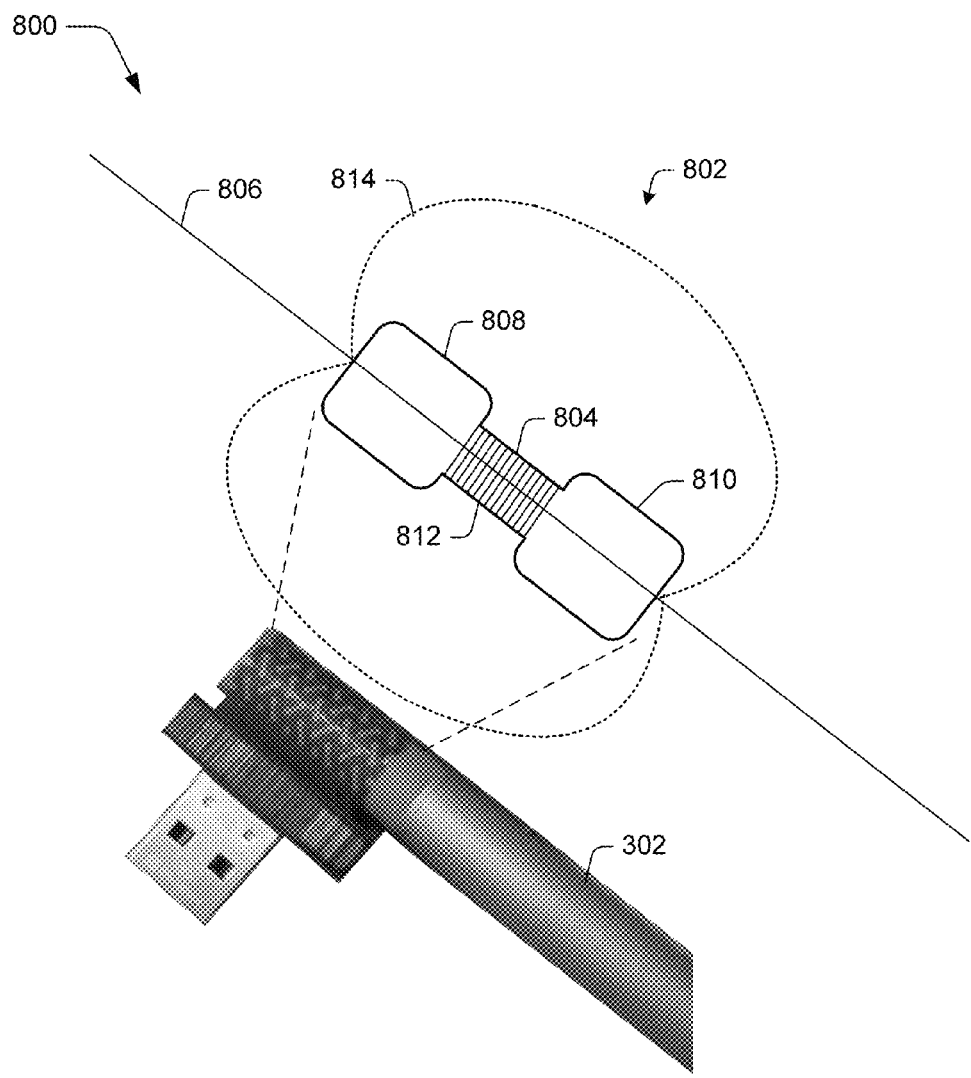
FIG. 8 depicts an example implementation of secondary coil usage by a peripheral device of FIG. 1 to form an inductive communicative coupling between devices.

FIG. 8 depicts an example implementation 800 of a secondary coil usage by a peripheral device 122 of FIG. 1 for form an inductive communicative coupling between devices. Conventional secondary coils of air gap transformers are typically three centimeters by four centimeters and larger, making them difficult to place in peripheral devices 122 such as a stylus 302.

Accordingly, an inductive coil 802 in this example is formed from a single ferrous element, which in this example is a single integral piece having a middle portion 804 having a diameter about an axis 806 that is less than a diameter of opposing ends 808, 810 of the single ferrous element along the axis 806.

A coil 812 is wrapped around the middle portion 804 such that the coil 812 and the single ferrous element form an inductive coil 802 that is substantially rotationally invariant around the axis. The inductive coil 802 may include an open tunnel (e.g., similar to a pipe) running through a longitudinal access, which may be used to permit wires to be run through the tunnel to support communication from one end of the stylus to the other. The diameter of the opposing ends 808, 810 allow the ferrous material to extend to an edge of a housing of the stylus 302 and the cylindrical shape makes coupling rotationally invariant by forming flux lines 814 in a shape that mimics a donut as illustrated. This secondary coil assembly can be made small and dense enough to fit well in a stylus 302 while transferring enough power to charge an internal battery in any rotational position.

Inductive coupling between primary and secondary coils is sensitive to the distance between the coils. The smaller the coils, the faster this loss of coupling occurs. Further, the stylus 302 may typically be stored in a way that does not constrain a longitudinal rotational position of the stylus. Therefore, by using a shape that mimics a dumbbell as shown in FIG. 8, the inductive coil 802, in this instance operating as a secondary coil, may minimize a distance to the primary coil of the peripheral retention device 110 while having good coupling at any longitudinal rotational angle. Although described as a secondary coil in this example, the inductive coil 802 may also function as a primary coil as further described below.

Figure 9:
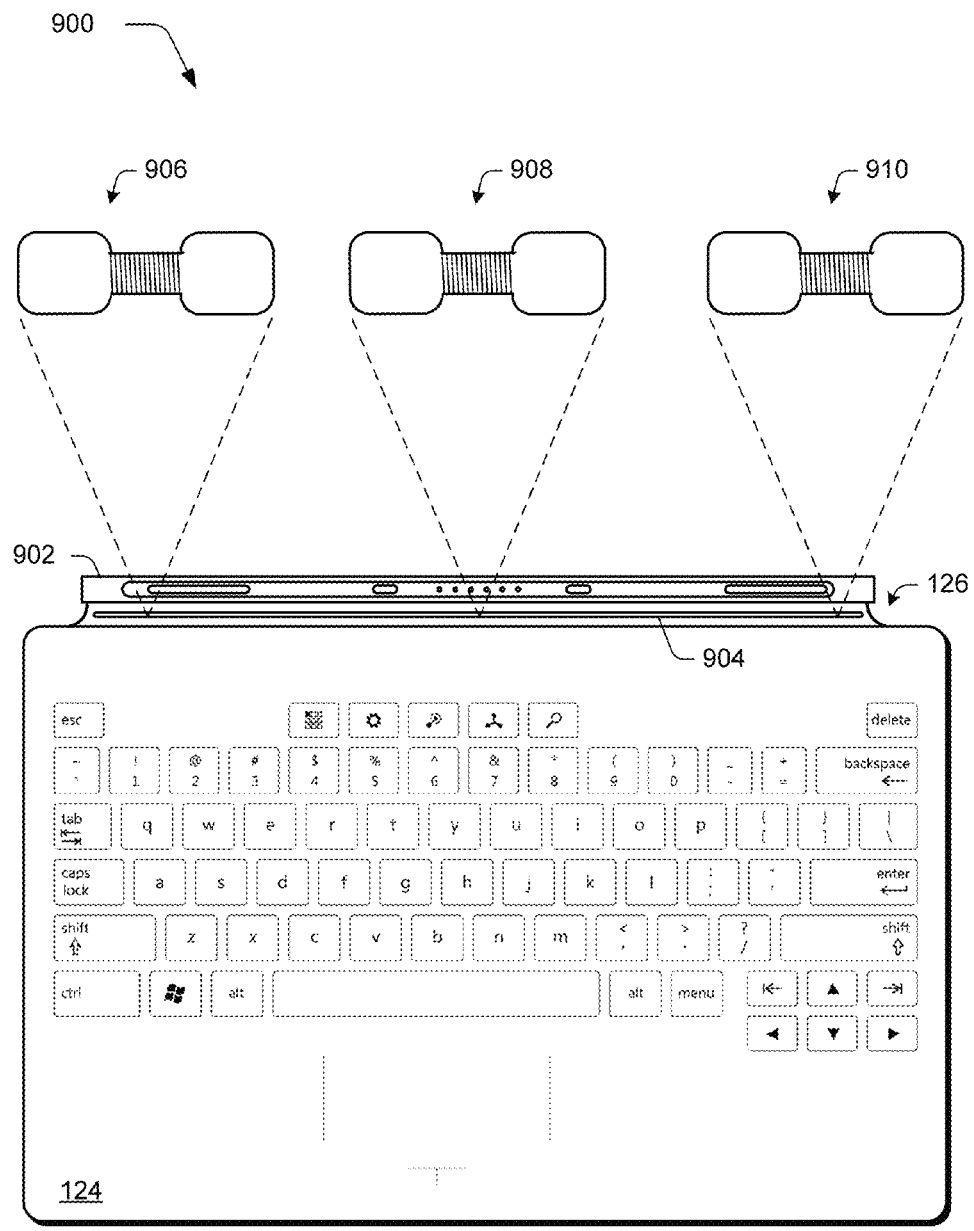
FIG. 9 depicts an example implementation in which an inductive coil of FIG. 8 is configured to operate as a primary coil in an air gap transformer arrangement.

FIG. 9 depicts an example implementation 900 in which an inductive coil of FIG. 8 is configured to operate as a primary coil in an air gap transformer arrangement. In this example, a connection portion 902 of the input device 124 is shown that is configured to provide a communicative and physical connection between the input device 124 and the computing device 102. The connection portion 902 as illustrated has a height and cross section configured to be received in a channel in the housing of the computing device 102, although this arrangement may also be reversed without departing from the spirit and scope thereof.

The connection portion 902 is flexibly connected to a portion of the input device 104 that includes the keys through use of the flexible hinge 126. Thus, when the connection portion 202 is physically connected to the computing device the combination of the connection portion 902 and the flexible hinge 126 supports movement of the input device 124 in relation to the computing device 102 that is similar to a hinge of a book.

The flexible hinge 126 in this example includes a midspine 904 having a plurality of inductive coils 906, 908, 910 that are configured similar to the inductive coil 902 of FIG. 8 but in this instance operate as primary coils of an air gap transformer. Thus, to form a communication coupling between the input device 124 (and thus the computing device 102 of FIG. 1) to a stylus 302 of FIG. 3 or other peripheral device 122 in this example a user may rest the stylus 302 against the flexible hinge or secure it thereto using a pen clip of the stylus 302 to cause an inductive coupling. This may be utilized to charge the stylus, transfer data (e.g., to authenticate the peripheral device 122), and so on as previously described. Further, flux flow lines may also support a rotationally invariant shape such that the flexible hinge 126 may move yet still support the communicative coupling.

Figure 10:
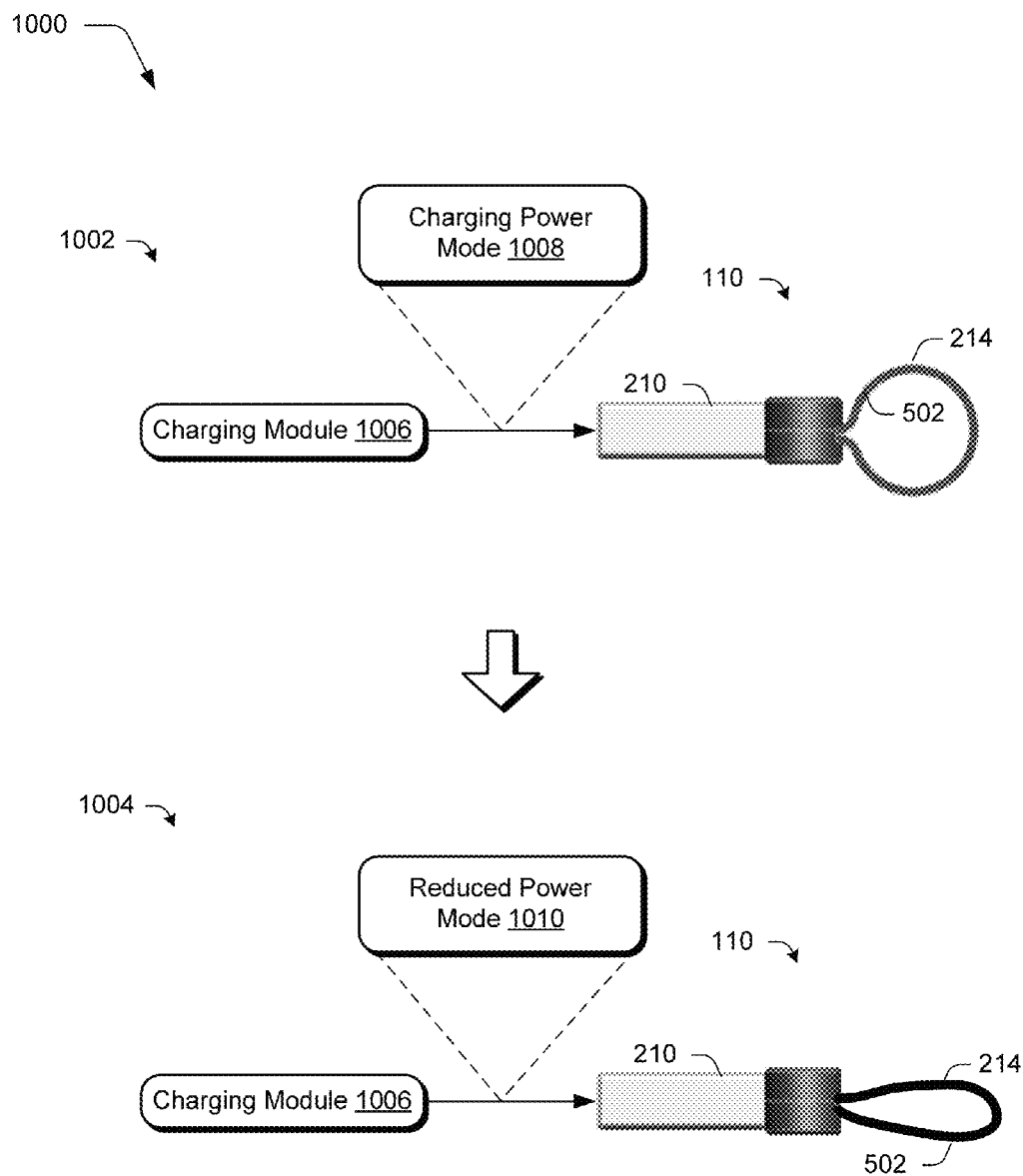
FIG. 10 depicts an example implementation in which power modes are utilized to control an amount of power provided to the inductive element of FIG. 5 of the peripheral retention device of FIG. 2.

FIG. 10 depicts an example implementation 1000 in which power modes are utilized to control an amount of power provided to the inductive element 502 of the peripheral retention device 110. This example implementation is shown using first and second stages 1002, 1004. A charging module 1006 is illustrated at each of the stages that is representative of functionality to control an amount of power provided by the peripheral retention device 110 to the inductive element 502. The charging module 1006, for instance, may be incorporated as part of the peripheral retention device 110 itself, a device to which the peripheral retention device 110 is attached (e.g., the computing device 102), and so forth.

At the first stage 1002, a charging module 1006 detects that the flexible loop 214 and corresponding inductive element 502 is arranged as a loop, such as the insertion of a pen. This may be determined by measuring inductance of the inductive element 502 by the charging module 1006. The ferrite secondary receiving coil inside the pen causes a significant increase in the inductance of the inductive element 502. Thus, the charging module 1006 may determine that the inductive element 502 is configured to support a communicative coupling and may provide a level of power sufficient to charge a peripheral device 122, e.g., power mode 1008.

At the second stage 1004, however, the charging module 1006 detects that the flexible loop 214 and corresponding inductive element 502 has collapsed. This may be detected by the charging module 1006 by detecting that the inductive element 502 exhibits low inductance. For example, opposing sides of the charging module 1006 may cause a short when disposed closely to each other, such as when the flexible loop 214 collapses or flattens.

Accordingly, the charging module 1006 may detect that the flexible loop 214 and corresponding collapsed or shorted state and enter a reduced power mode 1010 that supplies less power to the inductive element 502 than when in the charging power mode 1008, e.g., may cease providing power all together, periodically provide power to determine inductance of the inductive element and thus whether to enter the charging power mode 1008, and so forth. In this way, the charging module 1006 may determine whether the peripheral retention device 110 is configured to perform inductance and react accordingly, such as to conserver power when not ready, transfer data, and so forth. Further discussion of this technique may be found in relation to FIG. 12.

FIG. 11 depicts an example implementation of a circuit 1100 usable by the peripheral retention device 110 to act as a primary coil of an air gap transformer. As before, the primary coil may be utilized to transfer power to charge a peripheral device 122, transfer data, and so forth.

Example Procedures

The following discussion describes inductive peripheral retention device techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the figures described above.

Functionality, features, and concepts described in relation to the examples of FIGS. 1-11 may be employed in the context of the procedures described herein. Further, functionality, features, and concepts described in relation to different procedures below may be interchanged among the different procedures and are not limited to implementation in the context of an individual procedure. Moreover, blocks associated with different representative procedures and corresponding figures herein may be applied together and/or combined in different ways. Thus, individual functionality, features, and concepts described in relation to different example environments, devices, components, and procedures herein may be used in any suitable combinations and are not limited to the particular combinations represented by the enumerated examples.

Figure 12:
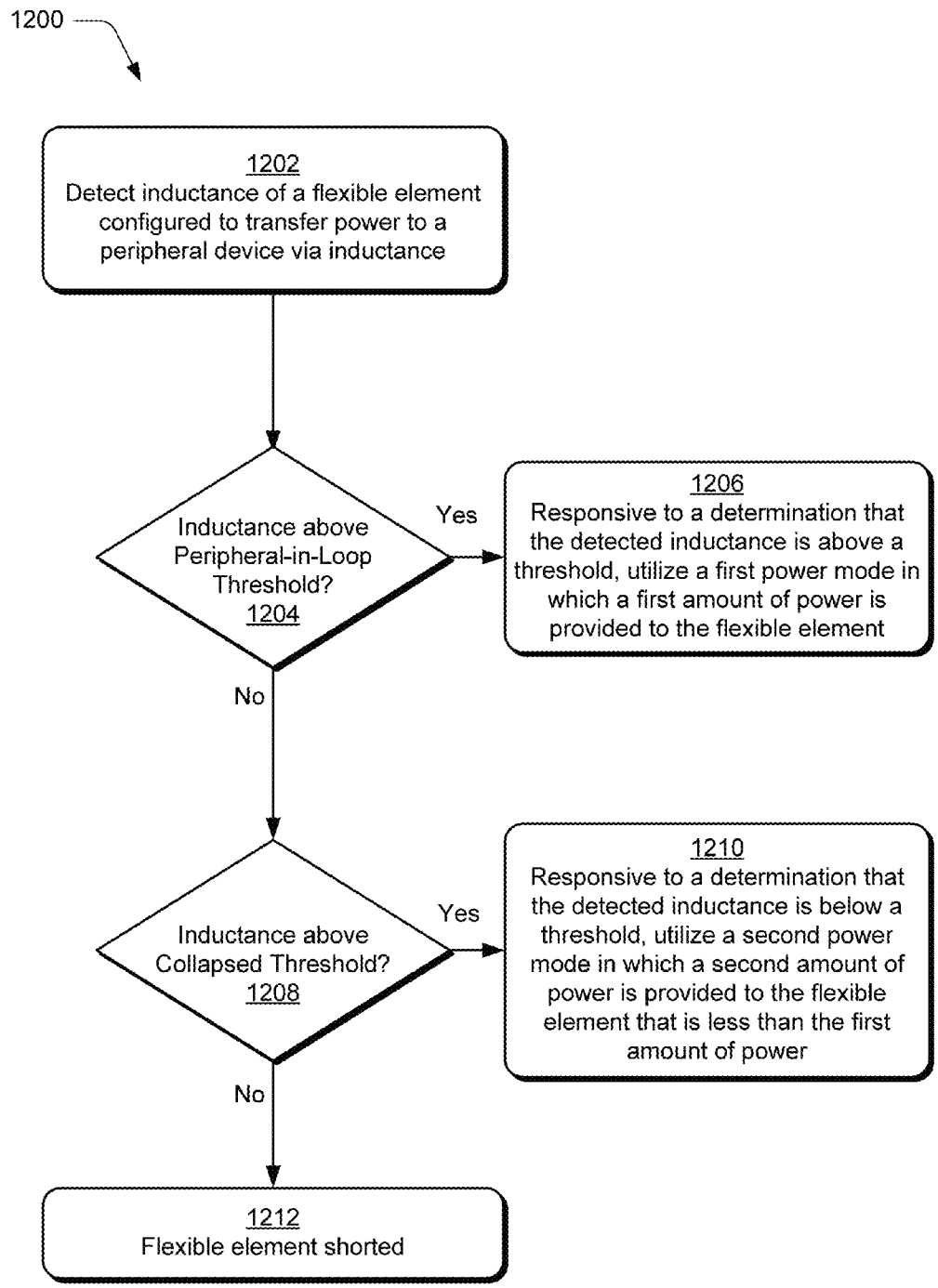
FIG. 12 is a flow chart depicting a procedure in an example implementation in which power modes are utilized based on a determination of a detection of inductance of a flexible loop.

FIG. 12 depicts a procedure 1200 in an example implementation in which power modes are utilized based on a determination of a detection of inductance of a flexible loop. There are three inductance scenarios, which may be detected and leveraged based on detection of inductance and/or current. These a scenario in which a peripheral device is not inserted (e.g., which has low inductance), a scenario in which a peripheral device is inserted (e.g., which has ten times the inductance of when a device is not inserted), and when an inductive element is not aligned with the flexible element but another metallic item is, which has the lowest inductance. Accordingly, thresholds may be utilized to differentiate between these scenarios, an example of which is described as follows.

Inductance is detected of a flexible element configured to transfer power to a peripheral device via inductance (block 1202). A charging module 1006, for instance, may measure inductance to determine whether the inductive element 502 is or is not experiencing a short.

At decision block 1204, a determination is made as to whether inductance is above a peripheral-in-loop threshold (decision block 1204). If so, ("yes" from decision bock 1204), responsive to a determination that the detected inductance is above a threshold, a first power mode is utilized in which a first amount of power is provided to the flexible element (block 1206). The threshold, for instance, may be set that is indicative of whether the inductive element is experiencing a short, set at an amount of inductance detected at a desired shape of the flexible element, e.g., the flexible loop 214 and corresponding inductive element 502) loop 214. If so, the charging module 1008 may provide an amount of power sufficient to transfer data, charge a peripheral device 122, and so forth.

In not ("no" from decision block 1204), a determination is made as to whether inductance is above a collapsed threshold (decision block 1208). If so ("yes" from decision block 1208), responsive to a determination that the detected inductance is below a threshold, a second power mode is utilized in which a second amount of power is provided to the flexible element that is less than the first amount of power (block 1210). This threshold may be the same or different than the previous threshold, e.g., may be set such that inductance levels below the threshold are indicative of a short, set for inductance levels detected at a flattened/collapsed shape of the flexible element (e.g., the flexible loop 214 and corresponding inductive element 502), and so forth.

If inductance is not above a collapsed threshold ("no" from decision block 1208), a determination is made that the flexible element is shorted (block 1212). A short circuit may be detected by inductance and also by detection of an excessive current draw above a threshold. Thus, a second power level may be employed, e.g., to "turn off" power to the inductive element 502, periodically check inductance at predetermined intervals of time, provide a minimal level of current usable to make the detection, and so forth. A timing profile may also be incorporated (e.g., 10 milliseconds on, two seconds off) to improve power savings. A variety of other examples are also contemplated without departing from the spirit and scope thereof.

Example System and Device

Figure 13:
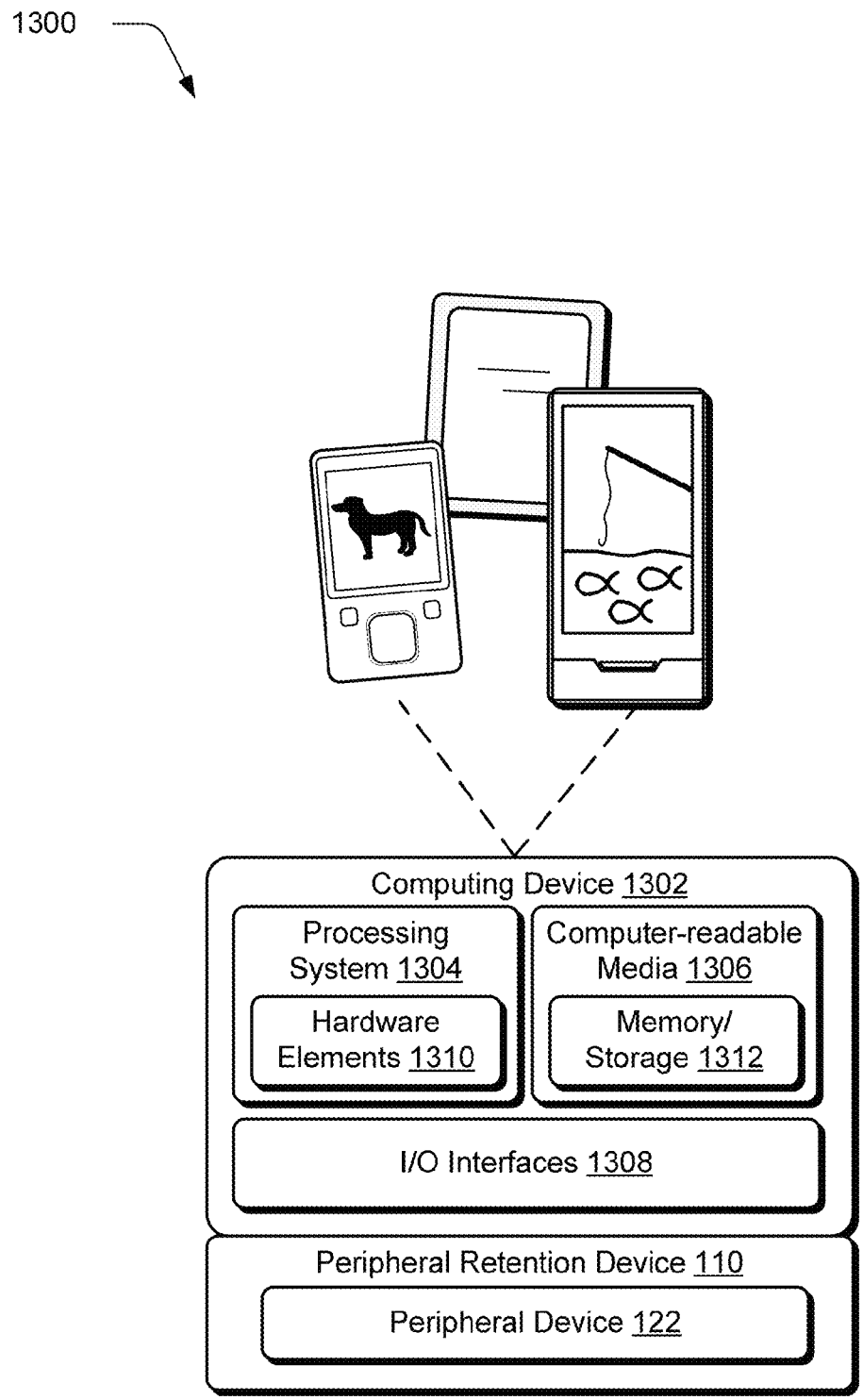
FIG. 13 illustrates an example system including various components of an example device that can be implemented as any type of computing device as described with reference to FIGS. 1-12 to implement embodiments of the techniques described herein.

FIG. 13 illustrates an example system generally at 1300 that includes an example computing device 1302 that is representative of one or more computing systems and/or devices that may implement the various techniques described herein. The computing device 1302 may be, for example, be configured to assume a mobile configuration through use of a housing formed and size to be grasped and carried by one or more hands of a user, illustrated examples of which include a mobile phone, mobile game and music device, and tablet computer although other examples are also contemplated. A peripheral retention device 110 is also included, which may be used to retain a peripheral device 122 as described above.

The example computing device 1302 as illustrated includes a processing system 1304, one or more computer-readable media 1306, and one or more I/O interface 1308 that are communicatively coupled, one to another. Although not shown, the computing device 1302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware element 1310 that may be configured as processors, functional blocks, and so forth. This may include implementation in hardware as an application specific integrated circuit or other logic device formed using one or more semiconductors. The hardware elements 1310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1306 is illustrated as including memory/storage 1312. The memory/storage 1312 represents memory/storage capacity associated with one or more computer-readable media. The memory/storage component 1312 may include volatile media (such as random access memory (RAM)) and/or nonvolatile media (such as read only memory (ROM), Flash memory, optical disks, magnetic disks, and so forth). The memory/storage component 1312 may include fixed media (e.g., RAM, ROM, a fixed hard drive, and so on) as well as removable media (e.g., Flash memory, a removable hard drive, an optical disc, and so forth). The computer-readable media 1306 may be configured in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1302 may be configured in a variety of ways to support user interaction.

The computing device 1302 is further illustrated as being physically coupled to a peripheral device 1314 that is physically removable from the computing device 1302, e.g., using magnetism. In this way, a variety of different input devices may be coupled to the computing device 1302 having a wide variety of configurations to support a wide variety of functionality.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1302. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1310. The computing device 1302 may be configured to implement particular instructions and/or functions corresponding to the software and/or hardware modules. Accordingly, implementation of a module that is executable by the computing device 1302 as software may be achieved at least partially in hardware, e.g., through use of computer-readable storage media and/or hardware elements 1310 of the processing system 1304. The instructions and/or functions may be executable/operable by one or more articles of manufacture (for example, one or more computing devices 1302 and/or processing systems 1304) to implement techniques, modules, and examples described herein.

CONCLUSION

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. An apparatus comprising:
   a plug configured to removably engage a communication port of a device to form a communicative coupling with the device, the plug is securable to and removable from the device using one or more hands of a user; and
   a peripheral securing portion connected to the plug and configured to removably engage a peripheral device via an inductive element formed as a flexible loop and configured to form a communicative coupling between the peripheral device and the device, the flexible loop comprising perforations such that the flexible loop is both flexible and stretchable.

2. An apparatus as described in claim 1, wherein the communicative coupling is configured to charge the peripheral device using power received by the plug from the device.

3. An apparatus as described in claim 1, wherein the communicative coupling is configured to communicate data between the device and the peripheral device.

4. An apparatus as described in claim 1, wherein the flexible loop is formed from a metal.

5. An apparatus as described in claim 1, wherein the flexible loop is covered with a fabric.

6. An apparatus as described in claim 1, wherein the peripheral device is a stylus.

7. An apparatus as described in claim 1, wherein the inductive element is configured to substantially surround at least a portion of a housing of the peripheral device.

8. An apparatus as described in claim 1, wherein flexing of the flexible loop is detectable using inductance by the device to control an amount of power to be provided via the communicative coupling.

9. An apparatus as described in claim 1, wherein the port is a Universal Serial Bus (USB) port.

10. An apparatus as described in claim 1, wherein the flexible loop has a sinusoidal trace pattern.

11. A peripheral retention device comprising:
    a plug configured to removably engage a communication port of a computing device to form a communicative coupling with the computing device; and
    a peripheral securing portion connected to the plug and configured to removably engage a peripheral device via an inductive element formed as a flexible loop and configured to form a communicative coupling between the peripheral device and the device, the flexible loop having a sinusoidal trace pattern.

12. A peripheral retention device as described in claim 11, wherein the communicative coupling is configured to charge the peripheral device using power received by the plug from the computing device.

13. A peripheral retention device as described in claim 11, wherein the communicative coupling is configured to communicate data between the computing device and the peripheral device.

14. A peripheral retention device as described in claim 11, wherein the flexible loop is formed from a metal.

15. A peripheral retention device as described in claim 11, wherein the flexible loop is covered with a fabric.

16. A peripheral retention device as described in claim 11, wherein the peripheral device is a stylus.

17. A peripheral retention device as described in claim 11, wherein the inductive element is configured to substantially surround at least a portion of a housing of the peripheral device.

18. A peripheral retention device as described in claim 11, wherein flexing of the flexible loop is detectable using inductance by the computing device to control an amount of power to be provided via the communicative coupling.

19. A peripheral retention device as described in claim 11, wherein the port is a Universal Serial Bus (USB) port.

20. A peripheral retention device as described in claim 11, wherein the flexible loop includes perforations such that the flexible loop is both flexible and stretchable.

* * * * *